United States Patent Office 3,274,597
Patented Sept. 20, 1966

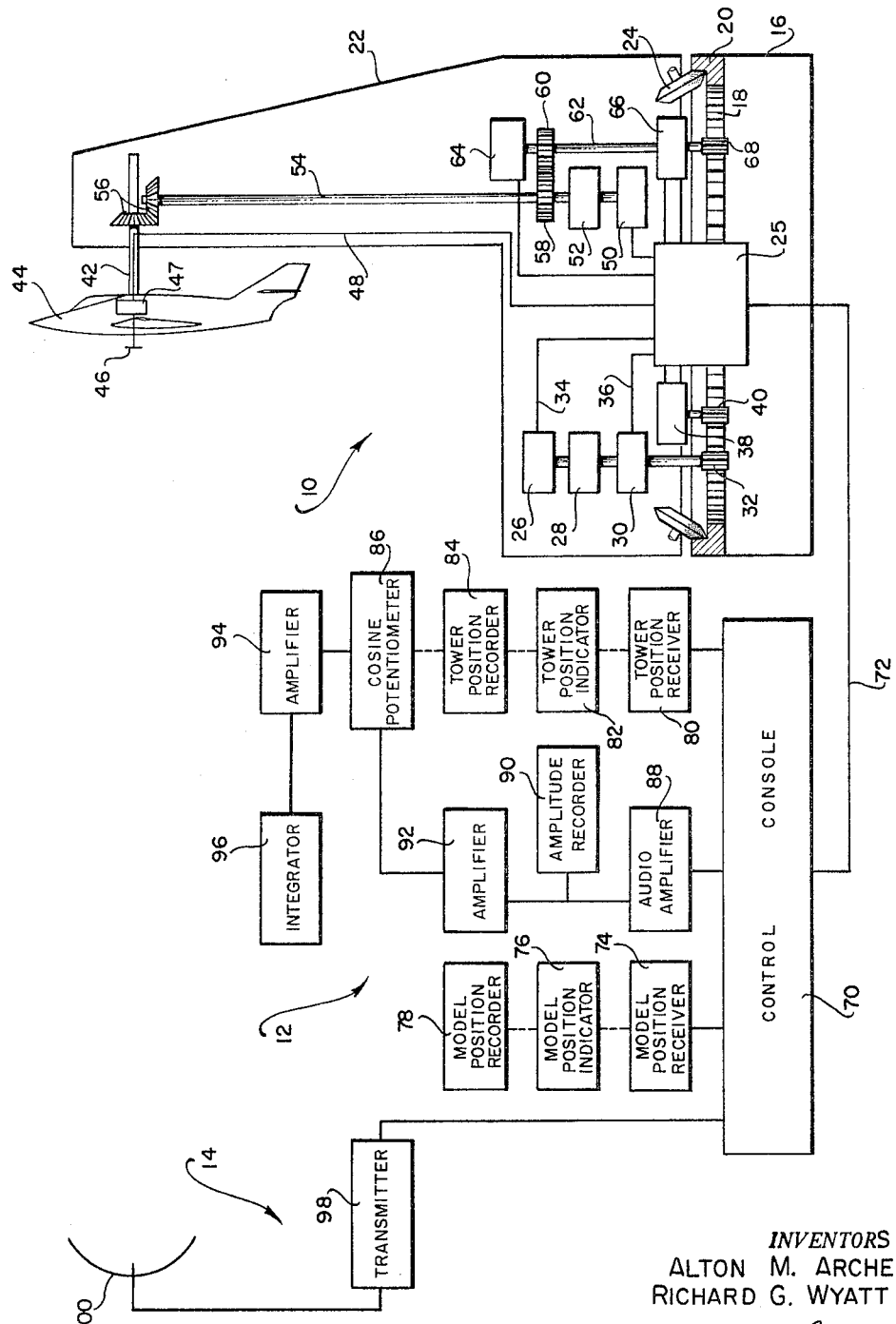

3,274,597
METHOD AND APPARATUS FOR
EVALUATING ANTENNAE
Alton M. Archer, Van Nuys, and Richard G. Wyatt, San Fernando, Calif., assignors to Lockheed Aircraft Corporation, Burbank, Calif.
Filed May 7, 1963, Ser. No. 278,682
9 Claims. (Cl. 343—100)

This invention relates to a method and apparatus for evaluating antennae.

Summarized, the invention relates to a method and apparatus for determining the total received energy for antennae which are intended to operate in a plurality of physical orientations with respect to the transmitting antenna. A model antenna, in its model environment, is created and is mounted to rotate about two axes at right angles to each other. A transmitting antenna, powered in such a way as to create radiation which is compatible with model, is located at a suitable position with respect to the model. The model is then simultaneously rotated about both of its axes while the power received by the model antenna is continuously modified in accordance with the model antenna position. The modified signal is totalized to give the total power received envelope for the particular transmitter conditions, model antenna characteristics and environment and the antenna signal amplification. The antenna signal amplification equipment is adjusted in output amplitude to bring the total received power envelope to a standard level. Thus the total received power is standardized. The total received power envelope of the model antenna is independent of the particular configuration of the receiving antenna about only one of its axes.

Accordingly, it is an object of this invention to produce a method for testing receiving antennae to determine their efficiency and the contour of their receiving envelope characteristics.

It is another object of this invention to provide apparatus which quickly, efficiently and accurately determines the characteristics of a receiving antenna.

It is another object of this invention to rapidly determine the total received power of a receiving antenna and to adjust the total received power of a receiving antenna to a standardized level, whereby the envelope of the receiving antenna may be accurately determined upon a standardized reference basis.

Other objects of this invention will become apparent upon study of the following specification and the appended drawing in which the single figure of the drawing shows a schematic arrangement of the elements of the instant antenna evaluation system.

Referring now to the drawing, the apparatus for evaluating antennae is comprised of three functional groupings. The model supporting, moving and indication system is shown at 10. The control, measurement and recording system is shown at 12 and the transmitter is shown at 14.

The model system 10 includes a stationary base 16 which is mounted on the ground or other basic support. It is provided with suitable leveling feet so that the vertical axis of the model system 10 is precise. The base 16 carries a ring gear 18 which includes an upstanding flange 20. Tower 22 carries at least three suitable rollers 24, bearingly mounted therein, which rest upon the ring gear 18 and against the upstanding flange 20. Thus tower 22 is mounted for rotation about a precise vertical axis upon the base 16. Mounted on both the base 16 and tower 22 is a rotating electrical connection 25 which contains suitable slip rings and brushes for appropriate electrical connection between the two relatively rotating parts. Mounted in the tower 22 is the tower drive motor 26 which is mechanically connected to reduction gears 28 and the gears 28 are mechanically connected to an electric clutch 30. The electric clutch 30, on its driven side, carries a pinion 32 which is in engagement with ring gear 18. Motor 26 and electric clutch 30 are connected to the rotating electrical connector 25 by lines 34 and 36, respectively, for control thereof. Tower position synchro transmitter 38 is mounted in tower 22 and carries a pinion 40 which is also in engagement with ring gear 18. Tower position synchro transmitter 38 is also connected through the rotating electrical connector 25.

A model representing the environment of the antenna being tested is mounted on shaft 42, which is mounted in the tower 22, having an axis of rotation at right angles to the axis of rotation of the tower 22. The model shaft 42 carries a model plane 44, which in turn carries the model antenna 46. In view of the fact that the receiving characteristics of the antenna in actual prototype usage are strongly influenced by the environment thereof, it is desirable and necessary to provide an environment which accurately represents the prototype configuration. In this case, since aircraft receiving antennae are of concern, a model airplane 44, accurately representing the prototype is provided to present a correct model environment. If the prototype plane is of metal, the model plane must also be of metal. Similarly the model antenna 46 must be accurately located on the model plane 44, corresponding to the prototype location.

Antenna lead 48 connects the antenna 46 to the rotating connection 25. Model drive motor 50 is mechanically connected to drive reduction gear 52 which in turn drives shaft 54. Bevel gears 56 connect model shaft 42 and shaft 54. Gear 58 on shaft 54 mates with gear 60 which is mounted on shaft 62. Accordingly, shaft 54 and shaft 62 rotate together. Shaft 62 carries model position synchro transmitter 64 which rotates with the model 44 and indicates the position thereof. Shaft 62 also drives a spiral clutch 66 which is electrically actuatable. The driven side of spiral clutch 66 carries a pinion 68 which mates with ring gear 18. Model drive motor 50, model position synchro transmitter 64 and spiral clutch 66 are electrically connected to the rotating electrical connector 25.

The control system 12 includes a control console 70 which is electrically connected by a master umbilical line 72 to the rotating electrical connector 25 so that all of the electrical functions of the model system 10 are communicated to the control console 70. By the master umbilical line 72, the model position synchro transmitter 64 is connected through the control console 70 to a model position synchro receiver 74 which rotates in a manner corresponding to the model 44. The model position synchro receiver 74 is mechanically connected to a model position indicator 76 which in turn is connected to drive model position recorder 78. Accordingly, the position of the model 44 about the axis of shaft 42 is continuously indicated and recorded. Similarly the tower position synchro transmitter 38 is electrically connected to the tower position synchro receiver 80, which in turn is mechanically connected to drive the tower position indicator 82. The indicator 82 is mechanically connected to drive the tower position recorder 84 which records the angular position of the tower on its axis, and which in turn is mechanically connected to drive cosine potentiometer 86.

The model antenna 46 is connected to a crystal demodulator 47 which modifies the signal to an audio signal of amplitude proportional to the radio frequency amplitude. The crystal is connected by line 48 to the rotating connector 25, and by umbilical line 72 to the console 70 where in turn it is connected to the audio amplifier 88. The audio amplifier 88 in turn is connected to amplitude recorder 90, and to cathode follower amplifier 92. The cathode follower amplifier 92 is electrically connected through cosine potentiometer 86 to amplifier 94 and thence to integrator 96. Also controlled from the control console 70 is radio frequency transmitter 98 and its associated radio frequency radiator 100, which is positioned to direct radio frequency energy toward model antenna 46.

For some data taking it is desirable for the model position recorder 78 to be connected with the audio frequency amplitude recorder 90. In this case the model position recorder 78 is a polar type with the angular position of the circular chart indicating the model position, and the radius of the scribed line indicating the amplitude of the received radio frequency. Similarly, in some cases data requirements make it desirable for the tower position to be recorded in association with the radio frequency amplitude. In this case the tower position recorder is of the polar type with the angular position of the circular chart indicating tower position and the radius of the scribed line indicating the radio frequency amplitude. Suitable switching is provided so that all three of these values can be recorded independently, or the values can be recorded in pairs as indicated.

According to the instant method for evaluating antennae the control console is first arranged so that the normal drive clutch 30 is disengaged and the spiral drive clutch 66 is engaged. When motor 50 is energized, the model 44 rotates at the same time the tower 22 rotates. Normally, rotation of the model 44 about the axis of shaft 42 is faster than the tower rotation. It is considered desirable to have 36 to 1 gearing, so that the model 44 makes one revolution on shaft 42 for each 10 degrees of rotary motion of the tower 22 about its axis. With the clutches so arranged, the motor 50 drives the model 44 through shaft 54 and drives the tower 22 through clutch 66. The tower and model are set in starting position, the integrator 96 is set to zero, and the radio frequency transmitter 98 is prepared for transmission. Simultaneously, the motor 50 is energized, the integrator 96 is started and the radio frequency transmitter 98 is energized. Thereupon the model 44 rotates about both the axis of shaft 42, and the tower axis, and received power from the antenna 46 is transmitted to the audio amplifier 88, thence through cathode follower amplifier 92 and the cosine potentiometer 86 to the integrator 96. The cosine potentiometer 86 modifies the received signal so that the tower position is continuously calculated into the total power received. As the tower 22 makes a half revolution, with 18 comparable revolutions of the model 44, the signal received by antenna 46 is modified by the cosine function of the angle of tower 22 in the cosine potentiometer 86, and the time function of the cosine modified received power is totalized in integrator 96. This defines the total envelope of the antenna 46. It is well known, particularly for folded dipoles, that antennas have a non-spherical receiving pattern. In other words, the power radiated toward the antenna in one particular space angle must be very much higher to produce a significant signal, such as 6 millivolts at the receiver terminals than at another space angle. Thus the receiving effectiveness varies with the space angle. By spiraling the antenna 46 in its environment the total integrated content of the envelope is well defined by the integrated power at integrator 96.

When the total envelope is known, the audio amplifier 88 can be adjusted at control console 70 so that the power radiated from radio frequency radiator 100 defines an envelope of an apparent standard volume for the particular antenna. The overall effectiveness of the antenna is defined by the amplification required in audio amplifier 88 to obtain this standard volume, but more important, the envelope configuration can be determined through several sections while the apparent standard envelope volume is maintained. Thus the lobe shape of several different antennae can be directly compared without using conversion factors for each comparison.

In the next step in evaluating the antenna, only one of the drives is used. For example, the axis of shaft 42 is set at right angles to the direction of power radiated from radiator 100 and both the normal clutch 30 and the spiral clutch 66 are disengaged. Then the motor 50 is energized, so that the model 44 rotates on a yaw axis. The model position synchro transmitter 64 drives the model position recorder 78, and the audio amplifier 88 acts with the recorder 78 to produce a polar diagram which shows the received energy lobes on the antenna in this plane.

In another condition, the airplane model 44 can be positioned nose up as shown in the drawing, and with the spiral clutch 66 disengaged and the normal clutch 30 engaged, the motor 26 is energized to drive the tower 22 about its vertical axis so that the model 44 rotates on its roll axis. When set up in this manner, the tower position synchro transmitter 38 drives the tower position recorder 84, and in association with the signal from audio amplifier 88, a polar diagram is produced showing the antenna lobes in a plane which is a vertical section through the model. In view of the flexibility of this system, polar power received envelope diagrams can be taken through any desired section to completely define the lobes characteristic of the particular antenna 46.

It is clear that by this system, using the cosine potentiometer to modify the received signal to determine the volume of the total envelope, much time is saved. Under former practice it was necessary to take a large number of individual sections of polar patterns and then reduce these patterns by multiplying the polar amplitude by the cosine of the polar angle. Only by considerable manual work was it possible to develop the total envelope. Even after such work, different test antennae were compared only on a basis of different total envelopes, and accordingly comparison was very difficult. By this system the total envelope is standardized and the individual polar patterns taken on definite planes can be directly compared, to compare the receiving characteristics of different model antennae.

Applicants having described their preferred process and apparatus it is clear to those in the art that numerous modifications are possible within routine engineering skill. Accordingly, the scope of the invention is defined by the scope of the appended claims.

We claim:
1. In a process for evaluating an antenna, the steps comprising:
   (a) radiating power toward said antenna;
   (b) rotating said antenna simultaneously upon two axes;
   (c) receiving power upon said antenna and multiplying said received power times the cosine of the angle of motion of said antenna about one of its axes; and
   (d) summing the product of received power times the cosine of the angle of motion while at least one of said axes makes at least one-half turn.

2. The process of claim 1 further including the steps of:
   (e) thereafter rotating said antenna on only one axis; and
   (f) continuously recording both the angular position of said antenna about its axis and the power received by said antenna.

3. In a process for evaluating an antenna, the steps comprising:
   (a) continuously and simultaneously rotating said antenna about two axes;
   (b) radiating power toward said antenna;
   (c) receiving power on said antenna and multiplying said received power times the cosine of one of the angles about which said antenna is rotating; and
   (d) integrating the product of the received power times the cosine of the antenna angle versus time to define the total power in the antenna envelope.

4. The process of claim 3 further including the steps of:
(e) thereafter rotating said antenna about only one of said axes; and
(f) continuously recording the power received by said antenna and the angle of said antenna as it rotates about said axis.

5. In an apparatus for evaluating an antenna, said apparatus including:
(a) a tower, said tower having a stationary base upon which it is mounted, said tower being rotatable about a substantially vertical axis, means on said tower for mounting the antenna to be tested upon an axis at substantially right angles to the tower rotation axis, means for rotating said tower and said antenna simultaneously about said axes;
(b) radiator means to radiate radio frequency energy toward said antenna;
(c) means to receive and amplify the radiated power received on said antenna, means to multiply the power received by said antenna with the cosine of the angle of one of the axes of rotation of the antenna as it rotates; and
(d) means to integrate the product of the received power and the cosine of the angle so that the total power envelope of said antenna is determined.

6. The structure of claim 5 wherein the cosine multiplying means is a cosine potentiometer driven by the rotation of the antenna about one of said axes, said cosine potentiometer being connected to said antenna and to said integrator.

7. The structure of claim 6 wherein separate drive means are provided to drive said tower about its vertical axis and said antenna about an axis at substantially right angles to said vertical axis.

8. The structure of claim 7 further including means to record the angle of the antenna on one of its axes and the power received by the antenna.

9. In an apparatus for evaluating an antenna, means for mounting said antenna so that it is continuously rotatable about first and second orthogonal axes, first means for driving said antenna so that it rotates about said first axis, second means for driving said antenna for rotation about said second axis, radiator means for radiating radio frequency energy toward said antenna, means for measuring the energy received by said antenna, cosine potentiometer means driven by rotation of said antenna about one of said axes, the energy received by said antenna being fed through said cosine potentiometer, and integrator means connected to the output of said cosine potentiometer to integrate the received signal.

References Cited by the Examiner

UNITED STATES PATENTS

| 2,602,924 | 7/1952 | Schmitt et al. | 343—100 |
| 2,605,418 | 7/1952 | Grass | 343—765 |
| 2,819,461 | 1/1958 | Bryan | 343—11 |
| 2,924,824 | 2/1960 | Lanctot et al. | 343—765 |
| 3,166,748 | 1/1965 | Shanks et al. | 343—100 |

CHESTER L. JUSTUS, *Primary Examiner.*

H. C. WAMSLEY, *Assistant Examiner.*